United States Patent [19]

Wakabayashi et al.

[11] Patent Number: 4,810,316

[45] Date of Patent: Mar. 7, 1989

[54] PROCESS FOR PRODUCING A FOAMED BASE MATERIAL FOR CAR CEILING MEMBER

[75] Inventors: Kouichi Wakabayashi; Nobuyoshi Shimayashiki, both of Kanuma; Akira Adachi, Sakura, all of Japan

[73] Assignee: Japan Styrene Paper Corp., Tokyo, Japan

[21] Appl. No.: 93,157

[22] Filed: Sep. 1, 1987

Related U.S. Application Data

[63] Continuation of Ser. No. 809,763, Dec. 17, 1985, abandoned.

[30] Foreign Application Priority Data

Dec. 25, 1984 [JP] Japan ................... 59-277888

[51] Int. Cl.⁴ .................. B29C 67/22; B29C 47/06; B29C 47/20; B32B 5/18
[52] U.S. Cl. ..................... 156/78; 156/198; 156/244.13; 156/244.24; 264/46.1; 264/53
[58] Field of Search .............. 264/53, 51, 46.1; 156/77, 78, 198, 244.13, 244.24

[56] References Cited

U.S. PATENT DOCUMENTS

| | | | |
|---|---|---|---|
| 3,121,911 | 2/1964 | Lightner | 264/53 |
| 3,194,864 | 7/1965 | Richie | 264/53 X |
| 3,248,462 | 4/1966 | Merrill et al. | 264/53 |
| 3,790,436 | 2/1974 | Graham, Jr. et al. | 428/318.8 |
| 3,804,684 | 4/1974 | Tokushige et al. | 428/318.8 X |
| 4,256,797 | 3/1981 | Stamper | 428/215 |

FOREIGN PATENT DOCUMENTS

| | | | |
|---|---|---|---|
| 53-32514 | 3/1978 | Japan | . |
| 55-42887 | 3/1980 | Japan | 264/46.1 |

*Primary Examiner*—Philip Anderson
*Attorney, Agent, or Firm*—Sherman & Shalloway

[57] ABSTRACT

A thermoplastic resin having a Vicat softening point of 115° C. or higher and containing a blowing agent is extruded and foamed into a foamed tubular body. The foamed tubular body is subjected to biaxial orientation and then pressed in antipodal directions, whereby the foamed tubular body is flattened and fusion-bonded at the resultant mutually-opposing inner walls thereof to obtain a foamed base material suitable for use in the fabrication of a car ceiling member. The foamed base material has not only excellent mechanical strength but also superb thermal strength. The foamed base material is not required to laminate films, sheets or the like thereon and is hence provided at a low cost.

5 Claims, 1 Drawing Sheet

PROCESS FOR PRODUCING A FOAMED BASE MATERIAL FOR CAR CEILING MEMBER

This application is a continuation of application Ser. No. 809,763, filed Dec. 17, 1985, now abandoned.

BACKGROUND OF THE INVENTION (1) Field of the Invention:

This invention relates to a foamed base material for a car ceiling member.

(2) Description of the Prior Art:

Car ceiling members have conventionally been produced, each, by pasting a cushioning material made of polyurethane foam or the like on the interior-side surface of a molded article, which was obtained by forming a base material composed principally of a foamed thermoplastic resin into the shape of the ceiling member, and then pasting a decorative surfacing made of a synthetic resin sheet, knit or woven fabric or the like on the cushioning material.

As these base materials for foamed car ceiling members, there have been used those composed solely of various thermoplastic resin foams, those constructed by laminating various thermoplastic resin films or sheets on both sides of such foams (for example, Japanese Patent Laid-Open No. 32514/1978) and the like.

Conventional base materials for car ceiling members are however accompanied by such problems that in the case of those composed solely of foamed bodies, their mechanical strength such as compression strength and maximum bending load is not fully satisfactory and their thermal strength such as beam span is poor and they undergo deformations during their long-term application in car interiors where considerable temperature variations take place; and in the case of those obtained by laminating films or sheets on both sides of foamed bodies, their production costs are unexceptionally high although the provision of such surfacings was able to improve their mechanical strength, thermal strength and the like to certain extents.

SUMMARY OF THE INVENTION

With the foregoing in view, the present invention has as its object the provision of a foamed base material for a car ceiling member, which base material has excellent mechanical and thermal strength and is of an inexpensive price.

The present inventors have carried out an extensive research with a view toward developing a foamed base material for a car ceiling member, which base material has excellent mechanical and thermal strength and is of an inexpensive price. As a result, it has been found that a foamed body obtained by forming a foamed cylindrical extrudate, which is made principally of a thermoplastic resin having a Vicat softening point of 115° C. or higher, into a flattened shape, subjecting the extrudate to biaxial orientation and then fusion-bonding the resultant mutually-opposing inner walls to each other is excellent as a foamed base material for a car ceiling member, leading to completion of this invention.

In one aspect of this invention, there is thus provided a foamed base material for a car ceiling member, characterized in that said foamed base material has been obtained by extruding and foaming a thermoplastic resin having a Vicat softening point of 115° C. or higher and containing a blowing agent into a foamed tubular body, subjecting the tubular body to biaxial orientation, and then pressing the foamed tubular body in antipodal directions, whereby the foamed tubular body is flattened and fusion-bonded at the resultant mutually-opposing inner walls thereof.

Owing to the above-mentioned features, the foamed base material of this invention has not only excellent mechanical strength but also superb thermal strength. It is therefore free from such a danger that it may develop deformations during its long-term application in a car interior which is subject to considerable temperature variations. Since the foamed base material has sufficient mechanical and thermal strength by itself, the present invention has brought about a variety of advantageous effects such that the foamed base material is not required to laminate films, sheets or the like thereon and is hence provided at a low cost.

The above and other objects, features and advantages of the present invention will become apparent from the following description and the appended claims, taken in conjunction with the accompanying drawings.

BRIEF DESCRIPTION OF THE DRAWINGS

The accompanying drawings show one embodiment of this invention, in which.

DETAILED DESCRIPTION OF THE INVENTION AND PREFERRED EMBODIMENT

As described above, the Vicat softening point of each thermoplastic resin to be employed in the present invention is required to be 115° C. or higher. If the Vicat softening point should be lower than 115° C., the thermoplastic resin has poor heat resistance and cannot achieve the object of the present invention. As exemplary thermoplastic resins, may be mentioned styrene-acrylic acid copolymer; styrene-methacrylic acid copolymer; copolymers of styrene and esters of acrylic or methacrylic acid such as methyl acrylate, ethyl acrylate and methyl methacrylate; copolymers of styrene and salts or amides of acrylic or methacrylic acid, such as copolymer of styrene and acrylic amide, acrylic acid and copolymers of styrene and salts of copolymers of styrene and salts of methacrylic acid; copolymer of styrene and maleic anhydride; copolymer of styrene and maleimide; poly-p-methylstyrene polycarbonate; and so on. It should however be borne in mind that the thermoplastic resin is not necessarily limited to the above-mentioned resins. Among the above-described resins, styrene-acrylic acid copolymer and styrene-methacrylic acid copolymer have excellent heat resistance and moldability and are thus preferred. Especially, those having Vicat softening points above 120° C. are preferred. It is also possible to blend one or more of other resins within the scope of the object of this invention.

Figure 1:
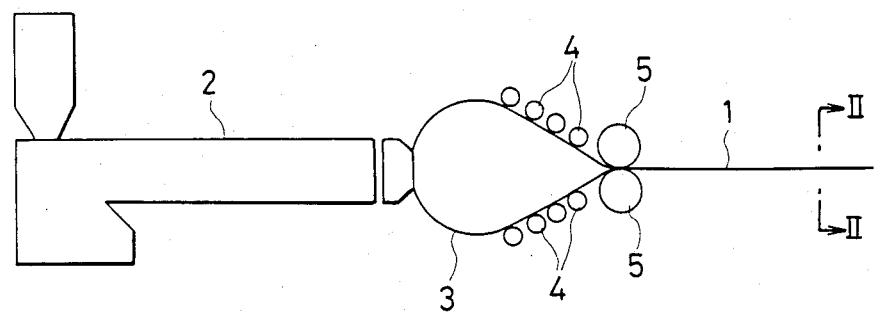
FIG. 1 is a schematic illustration showing a production process of a foamed base material for a car ceiling member, which pertains the present invention.
Figure 2:
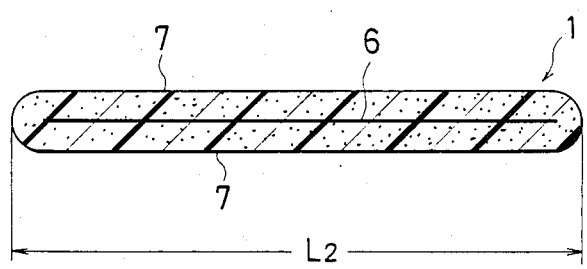
FIG. 2 is a transverse cross-sectional view of the foamed base material of this invention, taken along line II—II of FIG. 1.

As illustrated in FIG. 1 and FIG. 2, a foamed base material 1 for a car ceiling member, which pertains to the present invention, is constructed by mixing and kneading the above-described thermoplastic resin and a blowing agent in a molten state in an extruder 2, extruding the thus-kneaded mass through a circular die provided at the free end of the extruder 2 and causing the thus-extruded mass to foam into a foamed cylindrical body 3, and then pressing the foamed cylindrical body 3 in antipodal directions by means of guide rollers 4,4, . . . and pinch rollers 5,5 into a flattened shape so as to fusion-bond the resultant mutually-opposing inner walls 6 of the foamed body to form a planar plate.

Since the base material 1 of this invention is fusion-bonded at the flattened inner walls 6, its physical properties such as maximum bending load and beam span have been improved without need for the lamination of films, sheets or the like thereon.

The amount of the blowing agent still remaining in the the base material 1 of this invention may preferably range from 0.01 wt. % to 3 wt. %. This content range is preferred in forming the base material 1 into a final shape, because the limitation of the remaining blowing agent to the above-described range will protect the base material 1 from excessive plasticization upon its heating. As a blowing agent useful in the production of the base material 1 of this invention, any blowing agent may be suitably chosen from those employed for usual blowing, foaming or expanding purposes. Illustrative of such a blowing agent may include aliphatic hydrocarbons such as propane, butane, n-pentane and isopentane, halogenated hydrocarbons such as dichlorodifluoromethane, tetrafluoroethane, trichlorofluoromethane, methyl chloride and ethyl chloride, ethers such as methyl ether and ethyl ether, and the like. Of these, a mixture of dichlorodifluoromethane and methyl and/or ethyl chloride, a mixture of dichlorodifluoromethane and butane or a mixture of butane and methyl and/or ethyl chloride is preferred from the viewpoint of the molding performance of the thermoplastic resin. In addition, it is preferred to use a mixed blowing agent, which has been obtained by mixing dichlorodifluoromethane and methyl and/or ethyl chloride as blowing agents at a weight ratio of 5:95–80:20, in an amount of 1–6 parts by weight based on 100 parts by weight of the resin, because use of such a mixed blowing agent improves the expansion ratio of the base material 1, allows the amount of the remaining blowing agent contained in the base material 1 to fall within the above-described range, and ensures the fusion-bonding of the inner walls 6 of the foamed body which has been formed with a flattened shape by pressing the foamed cylindrical body 3 in antipodal directions.

The base material 1 of this invention has been subjected to biaxial orientation. Owing to synergistic effects of the biaxial orientation and the above-described fusion-bonded inner walls 6, the mechanical strength, especially, the beam span of the base material 1 has been leapingly improved. The degree of the above orientation may preferably be 5–40% or especially 15–40%. To control the degree of orientation within the above-described range, it is preferred to have the foamed cylindrical body 3 expand in such as way that upon extrusion and expansion of the foamed cylindrical body 3, its blow-up ratio (which is expressed by $(L_2 \times 2)/L_1$ wherein $L_1$ is the circumference of a die lip and $L_2$ stands for the width of the base material 1) becomes greater than 3, i.e., $(L_2 \times 2)/L_1 > 3$.

By the way, each degree of orientation is expressed in terms of its corresponding degree of heat shrinkage (dimensional changes) when heated at 150° C. for 100 seconds in an oven.

In order to impart sufficient mechanical strength of the base material 1 of this invention, it is preferable to form the base material 1 with an overall thickness in the range of 2–10 mm. It is also preferred that skin layers are formed respectively on both outer surfaces 7 of the base material 1. The provision of the skin layers can improve the compression strength and maximum bending load further. The above-described skin layers can be formed by cooling the foamed cylindrical body 3, which has been extruded from an extruder 2 and then caused to expand, at both outer surfaces thereof or by a like method.

Turning to the basis weight ($g/m^2$) of the base material 1 of this invention, a range of 250–600 $g/m^2$ is preferred. Any basis weights smaller than 250 $g/m^2$ may not be able to bring about fully satisfactory mechanical strength, while any basis weights greater than 600 $g/m^2$ are unacceptable from the viewpoint of weight reduction and at the same time result in higher production costs.

Figure 3:
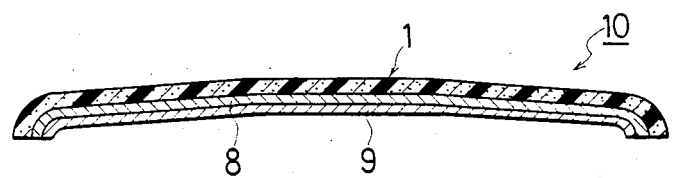
FIG. 3 is a schematic longitudinal cross-sectional view of an illustrative car ceiling member.

After having been formed into the shape of an intended car ceiling member, the base material 1 of this invention is, as depicted in FIG. 3, applied with a cushioning material 8 made of polyurethane foam or the like on the interior-side surface thereof and further with a decorative surfacing 9 made of a synthetic resin sheet such as vinyl chloride, a knit or woven fabric or the like on the interior-side surface of the cushioning material 8, whereby a car ceiling member 10 is fabricated.

Incidentally, the erm "Vicat softening point" as used herein means a value measured in accordance with ASTM D-1525.

EXAMPLES

The present invention will hereinafter be described in further detail by the following Examples.

EXAMPLES 1–3

After mixing and kneading the mixed blowing agent composed of dichlorodifluoromethane and methyl or ethyl chloride shown in Table 1 with 100 parts by weight of a copolymer of styrene and methacrylic acid (Vicat softening point: 126° C.) in a molten state in an extruder, a foamed cylindrical body was extruded through a circular die, followed by its expansion at its corresponding blow-up ratio given in Table 1. The foamed cylindrical body was then pressed in antipodal directions, whereby the foamed tubular body was flattened and fusion-bonded at the resultant mutually-opposing inner walls thereof to form a planar foamed body (a base material suitable for the fabrication of a car ceiling member). Properties of the thus-obtained foamed body are shown in Table 1.

The thus-obtained foamed body was then shaped by means of a headliner-forming mold. Various properties of the thus-shaped foamed body were measured. Measurement results are also given in Table 1.

COMPARATIVE EXAMPLE 1

After adding the mixed blowing agent given in Table 1 to 100 parts by weight of the same resin as that employed in Examples 1–3 and then mixing and kneading the resultant mixture in a molten state in an extruder, the resin was extruded into a cylindrical shape through a circular die. Without pressing it in antipodal directions, it was cut open longitudinally and then allowed to expand into a planar shape. Properties of the planar foamed body are shown in Table 1. Thereafter, it was shaped by using the same headliner-forming mold as that employed in Examples 1–3. After the shaping, various properties of the resultant foamed body were measured. Measurement results are also given in Table 1.

EXAMPLE 4

A planar foamed body was obtained by conducting an extrusion and expansion operation under the same conditions as in Example 2 except that a copolymer of styrene and maleic anhydride (Vicat softening point: 120° C.) was employed as a base resin. Properties of the foamed body are shown in Table 1. Then, the foamed body was shaped by means of the same headliner-forming mold as that employed in Examples 1-3. Properties of the thus-shaped foamed body are also shown in Table 1.

COMPARATIVE EXAMPLE 2

A planar foamed body was obtained by conducting an extrusion and expansion operation under the same conditions as in Example 2 except that polystyrene (Vicat softening point: 105° C.) was employed as a base resin. Properties of the foamed body are shown in Table 1. Then, the foamed body was shaped by means of the same headliner-forming mold as that employed in Examples 1-4. Properties of the thus-shaped foamed body are also shown in Table 1.

TABLE 1

|  | Example 1 | Example 2 | Example 3 | Example 4 | Comp. Example 1 | Comp. Example 2 |
|---|---|---|---|---|---|---|
| Conditions for extrusion and expansion | | | | | | |
| Blowing agent | | | | | | |
| (Blowing agent) Composition (wt. %) (added wt. parts) | | | | | | |
| Dichlorodifluoromethane | 15/0.4 | 50/1.5 | 80/3.3 | 50/1.5 | 50/1.5 | 50/1.5 |
| Methyl chloride | 84/2.0 | 50/1.5 | — | 50/1.5 | 50/1.5 | 50/1.5 |
| Ethyl chloride | — | — | 20/1.0 | — | — | — |
| Blow-up ratio | 3.5 | 3.5 | 3.5 | 3.5 | 2 | 2 |
| Foamed body before shaping | | | | | | |
| Basis weight (g/m$^2$) | 546 | 552 | 542 | 540 | 541 | 550 |
| Thickness (mm) | 4.7 | 4.6 | 4.5 | 4.5 | 4.6 | 4.6 |
| Skin layer | formed | formed | formed | formed | formed | formed |
| Degree of orientation | | | | | | |
| Longitudinal | 28 | 28 | 27 | 25 | 8 | 9 |
| Lateral | 25 | 27 | 25 | 25 | 5 | 6 |
| Foamed body after shaping | | | | | | |
| Thickness (mm) | 6.8 | 6.8 | 6.5 | 6.8 | 6.8 | 6.8 |
| Maximum bending load$^1$ (kg) | | | | | | |
| Longitudinal | 2.5 | 3.6 | 3.8 | 2.0 | 1.5 | 1.0 |
| Lateral | 2.0 | 2.7 | 2.7 | 1.8 | 1.3 | 0.8 |
| 25% Compression strength$^2$ (kg/m$^2$) | 1.7 | 2.5 | 2.9 | 1.4 | 1.0 | 0.8 |
| Beam span$^3$ (mm) | | | | | | |
| Longitudinal (Lo.) | 3 | 6 | 7 | 10 | 28 | 35 |
| Lateral (La.) | 7 | 12 | 15 | 16 | 33 | 40 |
| $\sqrt{Lo. \times La.}$ | 4.6 | 8.5 | 10 | 13 | 30 | 37 |

Remarks:
$^1$A test piece of 50 mm × 150 mm wide was cut out from each foamed body after its shaping. The test piece was mounted on supports, which were arranged with an interval of 100 mm, at imaginary lines extending inwardly of and parellelly with their corresponding 50 mm long end edges with an interval of 25 mm. A load was applied at a rate of 20 mm per minute to the entire central width of the test piece (i.e., at the central position between the supports), thereby obtaining a load-deflection curve. The maximum load on the curve was recorded as the maximum bending load. By the way, each longitudinal maximum load corresponds to a measurement value of a test piece cut out with its 150 mm long sides extending in the direction of extrusion of the corresponding foamed body while each lateral maximum load corresponds to a measurement value of a test piece cut out with its 150 mm long sides extending in a direction perpendicular to the direction of extrusion of the corresponding foamed body.
$^2$ASTM-D-1621 was followed substantially. Setting the testing speed at 10 mm/min. and the size of each test piece as wide as 50 mm × 50 mm, the load required to compress the thickness of the test piece by 25% was measured. The measurement result was recorded as 25% compression strength.
$^3$A test piece of 150 mm × 450 mm wide was cut out from each foamed body after its shaping. The test piece was supported on two supports, which were arranged with an interval of 300 mm, at imaginary lines extending inwardly of and parellelly with their corresponding 150 mm long end edges with an interval of 75 mm. After superposing a polyethylene sheet of 150 mm × 450 mm wide and 20 mm thick on the upper surface of the test piece, the test piece was heated for 6 hours in a circulating-air drier controlled at 105° C. ± 2°C. Its beam span was expressed in terms of the degree of sagging of the test piece. By the way, each longitudinal beam span corresponds to a measurement value of a test piece cut out with its 450 mm long sides extending in the direction of extrusion of the corresponding foamed body while each lateral beam span corresponds to a measurement value of a test piece cut out with its 450 mm long sides extending in a direction perpendicular to the direction of extrusion of the corresponding foamed body. In addition to the longitudinal and lateral beam spans, their geometric mean is also shown.

Having now fully described the invention, it will be apparent to one of ordinary skill in the art that many changes and modifications can be made thereto without departing from the spirit or scope of the invention as set forth herein.

What is claimed is:

1. A process for the production of a foamed base material for a car ceiling member, which comprises melting and kneading a styrene-acrylic copolymer resin or styrene-methacrylic copolymer resin, having a Vicat melting point of at least 115° C., together with a blowing agent in an extruder, extruding the resultant melt through a circular die while applying biaxial orientatiion, to thereby form a foamed tubular body having a blow-up ratio greater than 3, and then pressing the foamed tubular body in antipodal directions, whereby the foamed tubular body is flattened and fusion-bonded at the resultant mutually-opposing inner walls thereof.

2. The process of claim 1 wherein the blowing agent is a mixture of dichlorodifluoromethane and methyl and/or ethyl chloride.

3. The process of claim 1 wherein the blowing agent is composed of a mixture of dichlorodifluoromethane and methyl and/or ethyl chloride at a weight ratio of 5:95–80:20, said blowing agent being used in an amount of 1–6 parts by weight per 100 parts by weight of the resin.

4. The process of claim 1 wherein the resultant melt is extruded through the circular die while applying biaxial orientation of from 5 to 40% in each of the two directions.

5. The method of claim 4 wherein the degree of biaxial orientation is from 15 to 40% in each direction.

* * * * *

UNITED STATES PATENT AND TRADEMARK OFFICE
CERTIFICATE OF CORRECTION

PATENT NO. : 4,810,316
DATED : March 7, 1989
INVENTOR(S) : KOUICHI WAKABAYASHI ET AL.

It is certified that error appears in the above-identified patent and that said Letters Patent is hereby corrected as shown below:

On the cover page of the patent, under Inventors, "Shimayashiki" should read --Shimoyashiki--.

Signed and Sealed this

Fourteenth Day of November, 1989

Attest:

JEFFREY M. SAMUELS

*Attesting Officer*  *Acting Commissioner of Patents and Trademarks*